United States Patent
Ferlitsch

(10) Patent No.: US 8,279,471 B2
(45) Date of Patent: Oct. 2, 2012

(54) VIRTUAL USB OVER NFC PRINTING METHOD AND SYSTEM

(75) Inventor: Andrew Rodney Ferlitsch, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1067 days.

(21) Appl. No.: 12/229,942

(22) Filed: Aug. 28, 2008

(65) Prior Publication Data

US 2010/0058359 A1 Mar. 4, 2010

(51) Int. Cl.
G06F 3/12 (2006.01)
H04B 5/00 (2006.01)

(52) U.S. Cl. ............... 358/1.15; 348/207.2; 709/203; 455/41.1; 455/41.2; 455/41.3

(58) Field of Classification Search .............. 358/1.15; 348/207.2; 370/338; 709/203; 455/41.1, 455/41.2, 41.3
See application file for complete search history.

(56) References Cited

U.S. PATENT DOCUMENTS

| | | | | |
|---|---|---|---|---|
| 6,705,781 | B2 * | 3/2004 | Iwazaki | 400/62 |
| 7,409,452 | B2 * | 8/2008 | Ragnet et al. | 709/227 |
| 7,873,774 | B2 * | 1/2011 | Orishko et al. | 710/313 |
| 7,930,407 | B2 * | 4/2011 | Ragnet et al. | 709/227 |
| 8,159,706 | B2 * | 4/2012 | Kato | 358/1.15 |
| 2002/0038612 | A1 | 4/2002 | Iwazaki | |
| 2002/0097262 | A1 | 7/2002 | Iwase et al. | |
| 2003/0017805 | A1 * | 1/2003 | Yeung et al. | 455/41 |
| 2003/0043771 | A1 * | 3/2003 | Mizutani et al. | 370/338 |
| 2003/0055735 | A1 | 3/2003 | Cameron et al. | 705/26 |
| 2003/0204661 | A1 | 10/2003 | Uemura | |
| 2004/0133708 | A1 | 7/2004 | Augustin et al. | 710/8 |
| 2004/0223186 | A1 | 11/2004 | Ito | 358/1.16 |
| 2005/0012770 | A1 | 1/2005 | Endo | |
| 2006/0090128 | A1 | 4/2006 | Reddy et al. | |
| 2006/0094405 | A1 | 5/2006 | Dupont | 455/414.1 |
| 2006/0111053 | A1 | 5/2006 | Wu et al. | 455/90.3 |

(Continued)

FOREIGN PATENT DOCUMENTS

JP 2000-284926 10/2000

(Continued)

OTHER PUBLICATIONS

Hewlett-Packard Corp., "Mobile Printing Solutions: Step-by-step Instructions," Nov. 28, 2007 < http://www.hp.com/large/ipg/solutions/ipgmobility_stepbystep.html#your_printer >, 3 pages.

*Primary Examiner* — Twyler Haskins
*Assistant Examiner* — Dennis Dicker
(74) *Attorney, Agent, or Firm* — Scot A. Reader

(57) ABSTRACT

A VUSB over NFC mobile printing method and system. In an exemplary arrangement, an imaging device has a network connection with an application server and an NFC interface for connecting with a client device. When a mobile user places his or her client device in proximity with the NFC interface, an NFC connection is established between the client device and the imaging device and the imaging device intermediates between the client device and the application server using a VUSB protocol to enable the user to select and upload from the client device to the imaging device a document file that the user wishes to print, after which the imaging device facilitates printing the document file in accordance with user preferences.

18 Claims, 9 Drawing Sheets

U.S. PATENT DOCUMENTS

| | | | |
|---|---|---|---|
| 2006/0179144 A1* | 8/2006 | Nagase | 709/226 |
| 2006/0192005 A1 | 8/2006 | Narui et al. | 235/439 |
| 2006/0252374 A1 | 11/2006 | Ban et al. | 455/41.3 |
| 2007/0081486 A1* | 4/2007 | Koide | 370/328 |
| 2007/0123167 A1 | 5/2007 | Lauper | 455/41.2 |
| 2007/0174455 A1 | 7/2007 | Sugimoto | |
| 2008/0037050 A1 | 2/2008 | Sasaki | |
| 2008/0318602 A1* | 12/2008 | Chang et al. | 455/466 |
| 2011/0075186 A1* | 3/2011 | Azuma | 358/1.14 |
| 2011/0292445 A1* | 12/2011 | Kato | 358/1.15 |

FOREIGN PATENT DOCUMENTS

| | | |
|---|---|---|
| JP | 2006-244321 | 9/2006 |
| JP | 2006287860 | 10/2006 |
| JP | 2007-088755 | 4/2007 |
| WO | WO2006077418 | 7/2006 |

\* cited by examiner

VIRTUAL USB OVER NFC PRINTING
METHOD AND SYSTEM

BACKGROUND OF THE INVENTION

The present invention relates to mobile printing and, more particularly, to a method and system for using virtual Universal Serial Bus (USB) over a near field communication (NFC) connection to select and upload a document file stored on a client device for printing on an imaging device.

Many client devices and host devices support USB device interfaces. A USB device interface is characterized by the access and transfer functions and protocols that it supports. A popular example is a USB mass storage device interface, which enables content stored on a client device to be rapidly uploaded to a host device for processing.

A USB device interface typically operates over a conventional USB connection between a client device and a host device. For example, a personal data assistant (PDA) may dock and synchronize with a personal computer (PC) via a conventional USB connection using a USB device interface. When the two devices are connected, the PC initiates an active sync with the PDA, which causes the PDA's file system to become mounted in the PC. A user can then perform various file system operations on the PDA's file system from the PC.

A USB device interface may also operate over a network connection between a client device and a host device through virtual USB (VUSB). In such a networked environment, the client device and the host device communicate over a wired or wireless network connection (e.g. Ethernet, WiFi, WiMAX, etc.) that does not natively support USB, and USB emulators running on the client device and host device make it appear to their respective operating systems as if the devices are communicating on a conventional USB connection.

These known uses of USB device interfaces are not well suited for mobile printing. In mobile printing, a user of a client device having a USB device interface may want to invoke the interface to rapidly upload a document file to a publicly accessible imaging device (e.g. print kiosk) for printing. However, a lack of capability and/or know-how to make a USB connection with the imaging device may leave the user unable to use the USB device interface to upload and print the document file.

SUMMARY OF THE INVENTION

The present invention, in a basic feature, provides a VUSB over NFC mobile printing method and system. In an exemplary arrangement, an imaging device has a network connection with an application server and an NFC interface for connecting with a client device. When a mobile user places his or her client device in proximity with the NFC interface, an NFC connection is established between the client device and the imaging device and the imaging device intermediates between the client device and the application server using a VUSB protocol to enable the user to select and upload from the client device to the imaging device a document file that the user wishes to print, after which the imaging device facilitates printing the document file in accordance with user preferences.

In one aspect of the invention, an imaging device comprises a processor, a network interface communicatively coupled with the processor and a NFC interface communicatively coupled with the processor, wherein under control of the processor the imaging device communicates with a client device via the NFC interface, wherein under control of the processor the imaging device communicates with an application server via the network interface, and wherein under control of the processor the imaging device intermediates between the client device and the application server to enable a user to select and upload from the client device to the imaging device using a VUSB protocol a document file and facilitates printing of the document file.

In some embodiments, the imaging device further comprises a front panel interface communicatively coupled with the processor, wherein the imaging device receives inputs from the user via the front panel interface and under control of the processor applies the inputs in intermediating between the mobile device and the application server to enable the user to select and upload from the client device to the imaging device the document file.

In some embodiments, under control of the processor the imaging device generates one or more VUSB packets including one or more messages received from the application server via the network interface and transmits the VUSB packets to the client device via the NFC interface.

In some embodiments, under control of the processor the imaging device receives one or more VUSB packets including one or more messages from the client device via the NFC interface, generates one or more application server-ready packets including the messages and transmits the application server-ready packets to the application server via the network interface.

In some embodiments, under control of the processor the imaging device discovers via the NFC interface using the VUSB protocol USB device interface support information for the client device and relays the USB device interface support information via the network interface to the application server.

In some embodiments, in response to the USB device interface support information the imaging device receives from the application server via the network interface a file system access command and under control of the processor relays the file system access command via the NFC interface to the client device using the VUSB protocol.

In some embodiments, in response to the file system access command the imaging device receives from the client device via the NFC interface file system information using the VUSB protocol and under control of the processor transmits the file system information to the application server via the network interface.

In some embodiments, in response to the file system information the imaging device receives from the application server via the network interface a file browser user interface description and under control of the processor displays on the front panel interface a file browser window in conformance with the file browser user interface description.

In some embodiments, the imaging device receives on the front panel interface a file upload instruction and under control of the processor transmits the file upload instruction via the network interface to the application server.

In some embodiments, in response to the file upload instruction the imaging device receives from the application server via the network interface a file upload command and under control of the processor relays the file upload command via the NFC interface to the client device using the VUSB protocol.

In some embodiments, in response to the file upload command the imaging device receives from the client device via the NFC interface the document file using the VUSB protocol and transmits to the application server via the network interface a notification regarding the document file.

In some embodiments, in response to the notification regarding the document file, the imaging device receives via the network interface a print management user interface description and under control of the processor displays on the front panel interface a print management window in conformance with the print management user interface description.

In some embodiments, the imaging device receives on the front panel interface a print settings instruction and under control of the processor transmits the print settings instruction via the network interface to the application server.

In some embodiments, in response to the print settings instruction the imaging device receives from the application server via the network interface a print command in conformance with the print settings instruction and under control of the processor converts the document file into a print-ready format and prints the document file in conformance with the print command.

In some embodiments, the imaging device receives on the front panel interface a print settings instruction and under control of the processor transmits the print settings instruction and the document file via the network interface to the application server, in response to which the imaging device receives from the application server via the network interface a print command in conformance with the print settings instruction and the document file in a print-ready format and under control of the processor prints the document file in conformance with the print command.

In another aspect of the invention, a VUSB over NFC printing method comprises the steps of establishing communication with a client device via a NFC interface, establishing communication with an application server via a network interface, intermediating between the client device and the application server using a VUSB protocol to enable a user to select and upload from the client device a document file and printing the document file.

In some embodiments, the intermediating step comprises applying VUSB/USB formatting to messages outbound on the NFC interface and removing VUSB/USB formatting from messages received on the NFC interface.

In some embodiments, the intermediating step comprises discovering via the NFC interface using the VUSB protocol USB device interface support information for the client device and relaying the USB device interface support information via the network interface to the application server.

In some embodiments, the intermediating step comprises interfacing with a file management application on the application server to present the user with a file browser window from which the user selects the document file.

In some embodiments, the intermediating step comprises interfacing with a print management application on the application server to present the user with a print management window from which the user selects settings for printing the document file.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
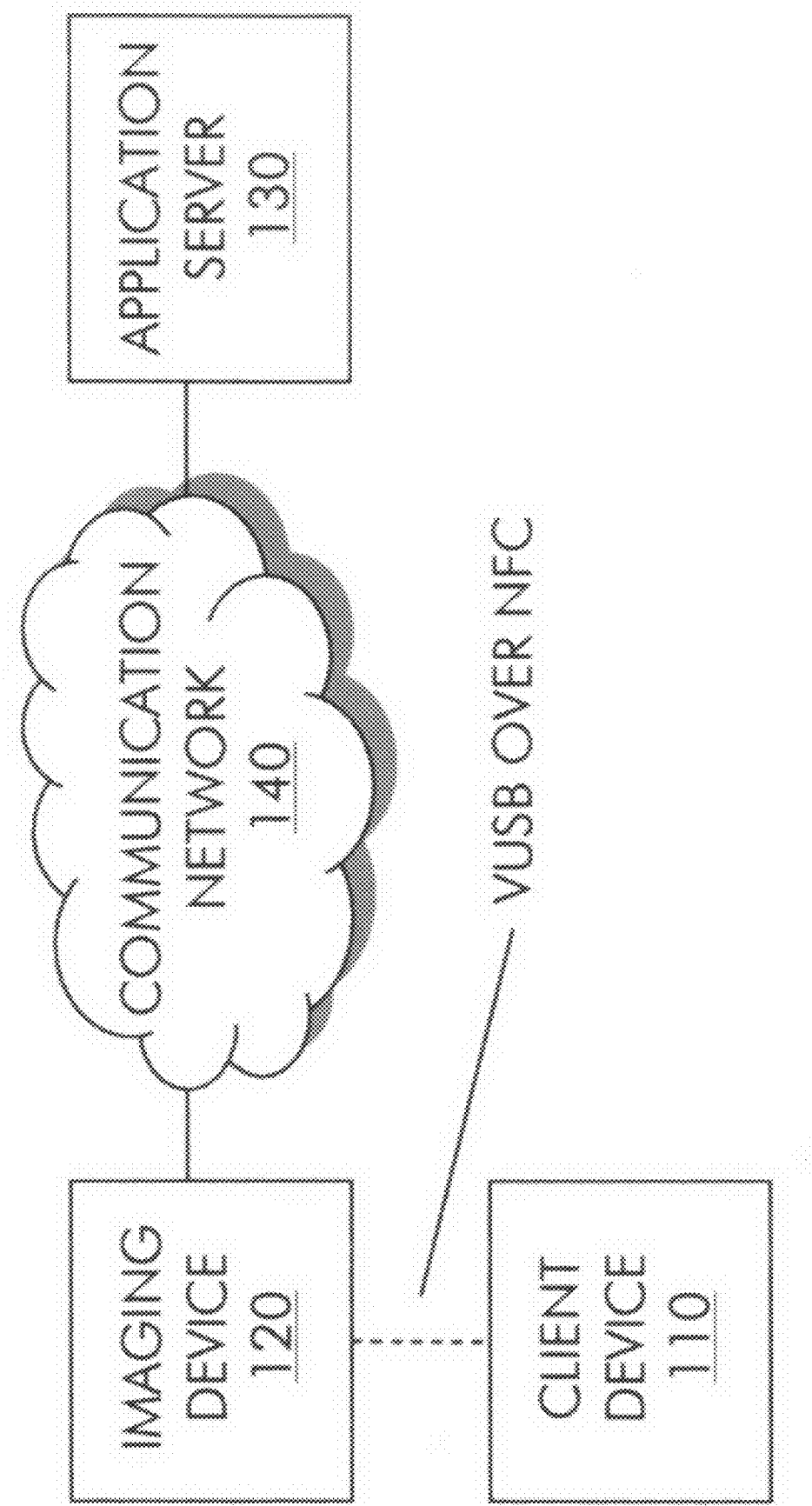
FIG. 1 shows a communication system.

FIG. 1 shows a communication system in some embodiments of the invention. The communication system includes an imaging device 120 communicatively coupled with a client device 110 via an NFC connection and communicatively coupled with an application server 130 via a communication network 140. Imaging device 120 in some embodiments is a publicly accessible printing device (e.g. print kiosk). Communication network 140 is a wired or wireless network that includes an arbitrary number of connecting devices, such as Institute of Electrical and Electronics Engineers (IEEE) 802.3 (wired Ethernet) switches and 802.11 (Wi-Fi) or 802.16 (WiMAX) access points and/or Internet Protocol (IP) routers that execute data communication protocols to support network connections and store and forward data traffic, and/or optical routers that support network connections and use a waveguide to guide optical data streams. Communication network 140 in some embodiments traverses the Internet.

Figure 2:
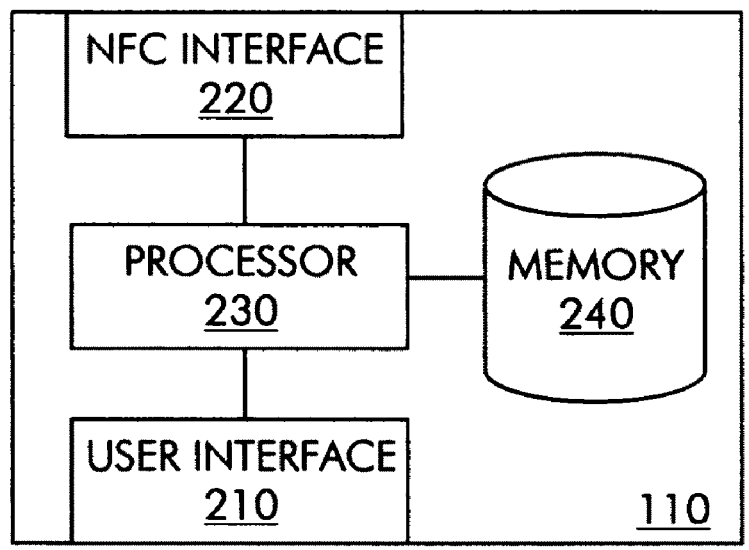
FIG. 2 shows the client device of FIG. 1 in more detail.

FIG. 2 shows client device 110 in more detail. Client device 110 may be a mobile personal computer, PDA or mobile phone, for example. Client device 110 includes an NFC interface 220, a user interface 210 and a memory 240, all of which are communicatively coupled with a processor 230. NFC interface 230 is a very short range wireless communication interface for transmitting and receiving information to/from imaging device 120 over an NFC connection. In some embodiments, NFC interface 220 operates in the radio frequency (RF) band at or near 13.56 MHz at a speed of between 106 and 424 kilobits per second over an operating distance of less than twenty centimeters. User interface 210 has an input mechanism, such as a keyboard, keypad or touch screen for accepting inputs from a user and an output mechanism, such as a liquid crystal display (LCD), light emitting diode (LED) display, or cathode ray tube (CRT) for displaying outputs to a user. Memory 240 includes one or more random access memory (RAM) and one or more read-only memory (ROM) elements. Processor 230 executes software installed in memory 240 to carry-out operations on client device 110 including facilitating configuration of a system for mobile VUSB over NFC printing and facilitating selection, uploading and printing of document files within such a system.

Figure 3:
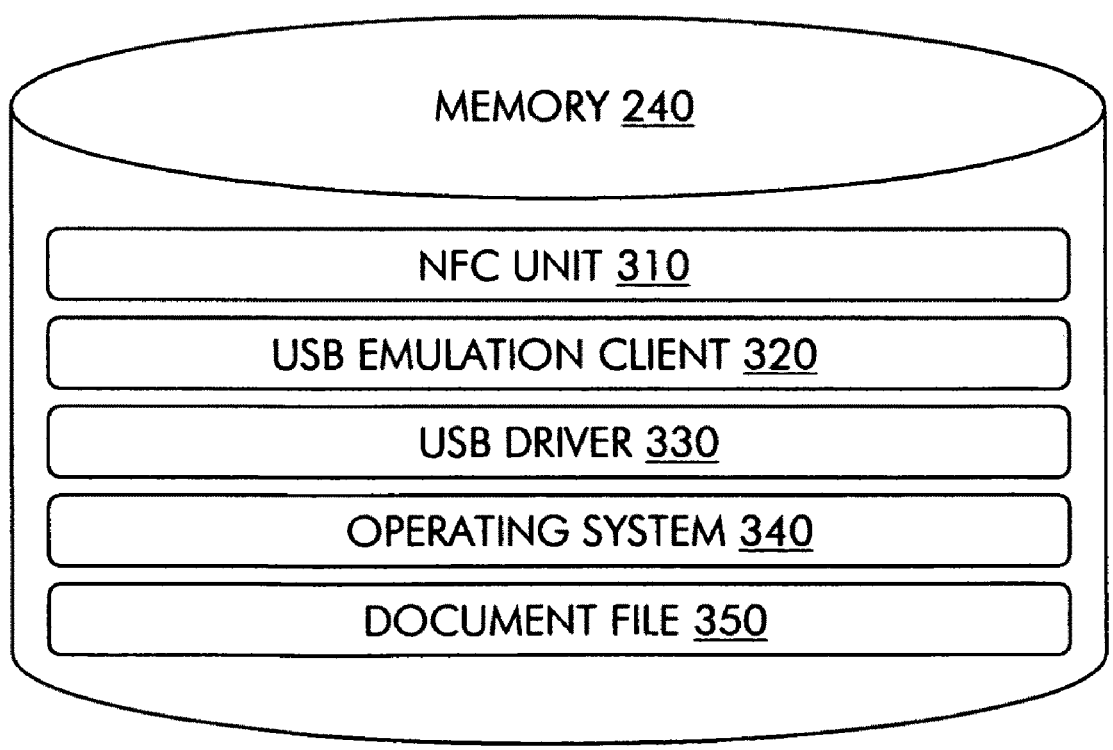
FIG. 3 shows elements stored on the client device of FIG. 1.

FIG. 3 shows elements stored on client device 110. Software elements stored in memory 240 and executable by processor 230 include an NFC unit 310, USB emulation client 320, USB driver 330 and operating system 340. Data elements stored in memory 240 include a document file 350.

NFC unit 310 establishes, tears-down and manages a very short range wireless connection via NFC interface 220 with imaging device 120 when client device 110 is in range of imaging device 120. The NFC connection in some embodiments has an operating distance of less than twenty centimeters. In some embodiments, NFC unit 310 operates as an initiator device that controls the terms of information exchange over the NFC connection, including choosing an initial communication speed and communication mode. In other embodiments, NFC unit 310 operates as a target device that exchanges information on an NFC connection established with imaging device 120 under terms of information exchange controlled by imaging device 120. NFC unit 310 implements a modulation and bit encoding scheme that depends on the speed and terminates an NFC connection on command or when client device 110 is no longer in range of imaging device 120. NFC unit 310 may support an active communication mode in which the initiator device and the target device each generate their own RF field to transmit information on NFC connections, and/or may support a passive communication mode in which the initiator device generates an RF field while the target device uses load modulation to transfer information. In some embodiments, NFC unit 310 implements a listen before talk policy in which client device 110 listens on the carrier frequency before transmitting and starts transmitting only if no other device is detected transmitting.

USB emulation client 320 performs VUSB format conversions that enable messages transmitted and received over the NFC connection with imaging device 120 to arrive in an expected format. When USB emulation client 320 receives from USB driver 330 a USB packet outbound from client device 110 on the NFC connection, USB emulation client 320 invokes a VUSB protocol to generate a VUSB packet that encapsulates the USB packet and forward the VUSB packet in an NFC-compliant format to NFC unit 310 for transmission on the NFC connection. When USB emulation client 320 receives from NFC unit 310 a VUSB packet inbound from imaging device 120 on the NFC connection, USB emulation client 320 invokes the VUSB protocol to recover a USB packet from the VUSB packet and transmit the USB packet in a USB-compliant format to USB driver 330. VUSB format conversions performed by USB emulation client 320 may include other forms of data manipulation, such as serial-to-parallel and/or parallel-to-serial data stream conversions.

USB driver 330 performs USB format conversions that enable messages transmitted and received over the NFC connection with imaging device 120 to arrive in an expected format. When USB driver 330 receives from operating system 340 a call requesting transmission of a message from client device 110 on the NFC connection, USB driver 330 invokes a USB protocol to generate a USB packet containing the message and forward the USB packet in a USB-compliant format to USB emulation client 320. When USB driver 330 receives from USB emulation client 320 a USB packet inbound from imaging device 120 on the NFC connection, USB driver 330 invokes a USB protocol to recover a message from the USB packet and generates a call to operating system 340 to convey the message.

Operating system 340 has one or more USB device interfaces that support access and transfer functions and protocols by which client device 110 may communicate with a USB host device. The USB device interfaces include a USB mass storage device interface that allows a document file 350 stored on client device 110 to be uploaded to imaging device 120 for printing or other processing.

Document file 350 contains content that may be printed or otherwise processed on imaging device 120. Document file 350 may be formatted in, for example, a document format (e.g. MS-Word), page description language (PDL) format, optical character recognition (OCR) text extraction format, image format (e.g. TIFF), eXtensible Markup Language Paper Specification (XPS) document archive format or web page archive format (e.g. MHT).

Figure 4:
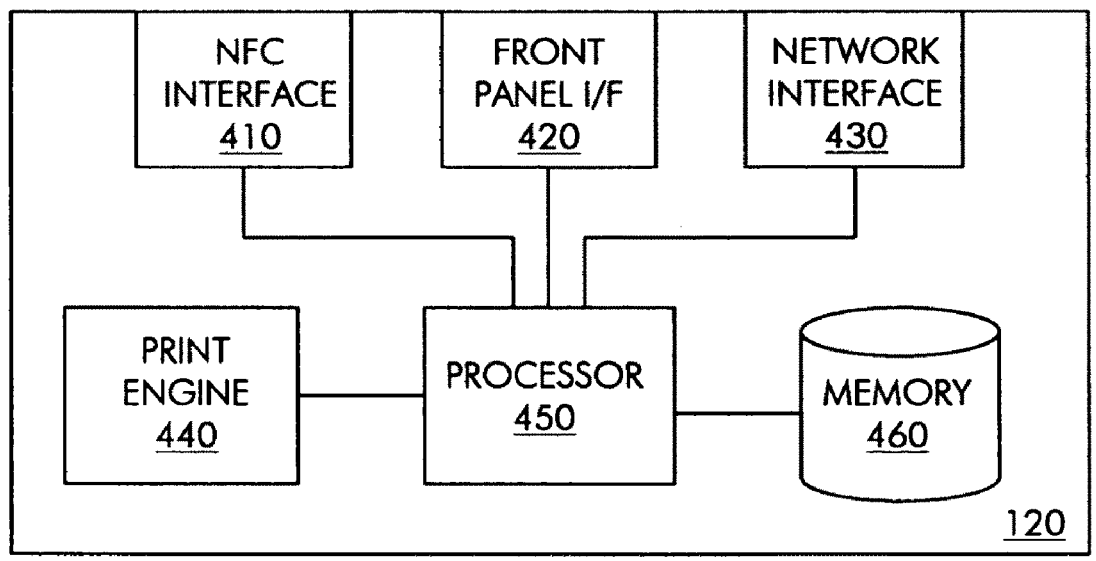
FIG. 4 shows the imaging device of FIG. 1 in more detail.

FIG. 4 shows imaging device 120 in more detail. Imaging device 120 is in some embodiments a multifunction peripheral (MFP) that supports multiple functions, such as printing, scanning and copying, and in other embodiments a single-function printing device without scanning or copying capabilities. Imaging device 120 has an NFC interface 410, front panel interface 420, network interface 430, print engine 440 and memory 460, all of which are communicatively coupled with a processor 450. NFC interface 410 is a very short range wireless communication interface for transmitting and receiving information to/from client device 110 over an NFC connection. In some embodiments, NFC interface 410 operates in the RF band at or near 13.56 MHz at a speed of between 106 and 424 kilobits per second over an operating distance of less than twenty centimeters. In some embodiments, NFC interface 410 includes a conspicuously marked contact surface on the exterior of imaging device 120 for receiving an NFC-aware client device, such as client device 110. NFC interface 410 has an RF-inductive interface as part of or underneath the contact surface, which may be a flat surface or a cradle-like surface, for example. Front panel interface 420 has an input mechanism, such as a keypad or touch screen for accepting inputs from a user and an output mechanism, such as a LCD display or LED display for displaying outputs to a user. Network interface 430 is a wired or wireless communication interface for transmitting and receiving messages to/from application server 130 over a wired or wireless connection. Network interface 430 may be, for example, a wired Ethernet interface, WiFi interface or WiMAX interface. Internal to imaging device 120, interfaces 410, 420, 430 are communicatively coupled with processor 450, memory 460 and print engine 440. Print engine 440 includes printer logic, such as one or more integrated circuits, and a mechanical section for performing printing functions. For example, print engine 440 may have a color ink jet head mounted on a movable carriage for printing a document by applying ink to paper under control of a printer integrated circuit, or may be a laser printing system in which a document is printed by liquefying and fusing toner to paper under control of a printer integrated circuit. Memory 460 includes one or more RAM elements and one or more ROM elements.

Figure 5:
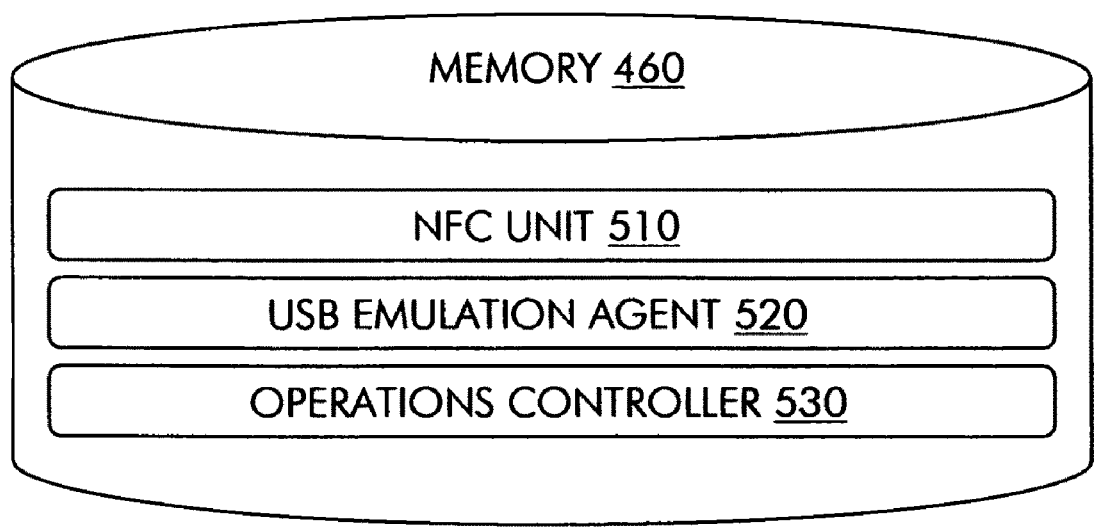
FIG. 5 shows elements stored on the imaging device of FIG. 1.

FIG. 5 shows elements stored on imaging device 120. Software elements stored in memory 460 and executable by processor 450 include an NFC unit 510, USB emulation agent 520 and operations controller 530.

NFC unit 510 establishes, tears-down and manages an NFC connection made via NFC interface 410 with client device 110 when client device 110 is in range of imaging device 120. An NFC connection is made when a user of client device 110 places client device 110 on a conspicuously marked contact surface on the exterior of imaging node 120 that has an RF-inductive interface as part of or underneath the contact surface. NFC unit 510 otherwise shares the properties of NFC unit 310.

USB emulation agent 520 discovers USB device interfaces supported by client device 110 and performs VUSB/USB format conversions that enable messages transmitted and received over the NFC connection with client device 110 to arrive in an expected format. In VUSB/USB format conversions, when USB emulation agent 520 receives a VUSB packet inbound from client device 110 on the NFC connection, USB emulation agent 520 removes the VUSB and USB formatting and relays the underlying message to operations controller 530. When USB emulation agent 520 receives from operations controller 530 a message inbound from application server 130 on a network connection and destined for client device 110, USB emulation agent 520 generates a VUSB packet that encapsulates a USB packet containing the message and forwards the VUSB packet in an NFC-compliant format to NFC unit 510 for transmission on the NFC connection. VUSB/USB format conversions performed by USB emulation agent 520 may include other forms of data manipulation, such as serial-to-parallel and parallel to serial data stream conversions.

In USB device interface discovery, USB emulation agent 520 generates and transmits to client device 110 via NFC interface 410 VUSB packets that encapsulate USB packets containing USB device interface discovery request messages, in response to which USB emulation agent 520 receives from client device 110 VUSB packets encapsulating USB packets containing USB device interface discovery response messages. A USB device interface discovery response message identifies one or more USB device interfaces supported by client device 110 and, in some embodiments; client device model information (e.g. model name and/or number for client device 110). USB emulation agent 520 removes the VUSB and USB formatting and relays the underlying response message to operations controller 530 for further processing.

Operations controller 530 controls input/output from/to NFC interface 410 (via USB emulation agent 520), front panel interface 420, network interface 430 and print engine 440 and processes messages transmitted via such input/output. If a message received from USB emulation agent 520 is destined for application server 130, operations controller 530 puts the message into an application server-ready format and relays the message to application server 130 via network interface 430. If a message received from USB emulation agent 520 is destined for imaging device 120, operations controller 530 handles the message internally. If a message received from application server 130 via network interface 430 in an application server-compliant format is destined for client device 110, operations controller 530 relays the message to USB emulation agent 520 for handling. If such a message is destined for imaging device 120, operations controller 530 handles the message internally. In some embodiments, a message in an application server-ready or application server-compliant format comprises an eXtensible Markup Language (XML) schema. Operations controller 530 also causes to be displayed on front panel interface 420 windows corresponding to user interface descriptions that may be native to imaging device 120 or received from application server 130. Operations controller 530 also processes inputs received from a user via front panel interface 420 and generates and transmits to application server 130 via network interface 430 in an application server-ready format messages related to such inputs. Finally, operations controller 530 services print jobs. A print job is serviced by converting a document file into print-ready data and submitting the print-ready data to print engine 440 for output in hard copy format. Conversion to print-ready data involves subjecting the document file to raster image processing (RIP), for example.

Figure 6:
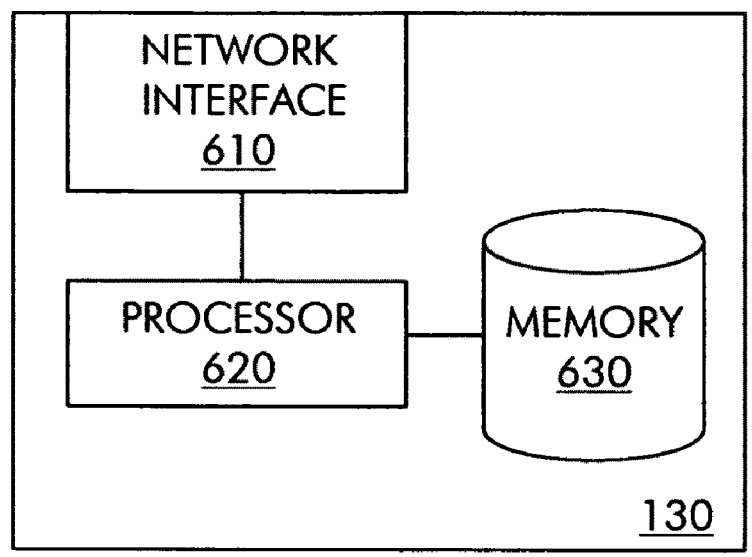
FIG. 6 shows the application server of FIG. 1 in more detail.

FIG. 6 shows application server 130 in more detail. Application server 130 provides software as a service (SaaS). Application server 130 has a network interface 610 and a memory 630 communicatively coupled with a processor 620. Network interface 610 is a wired or wireless communication interface for transmitting and receiving messages to/from imaging device 120 over a wired or wireless connection. Network interface 610 may be, for example, a wired Ethernet interface, WiFi interface, WiMAX interface, or cellular interface. Memory 630 includes one or more RAM elements and one or more ROM elements.

Figure 7:
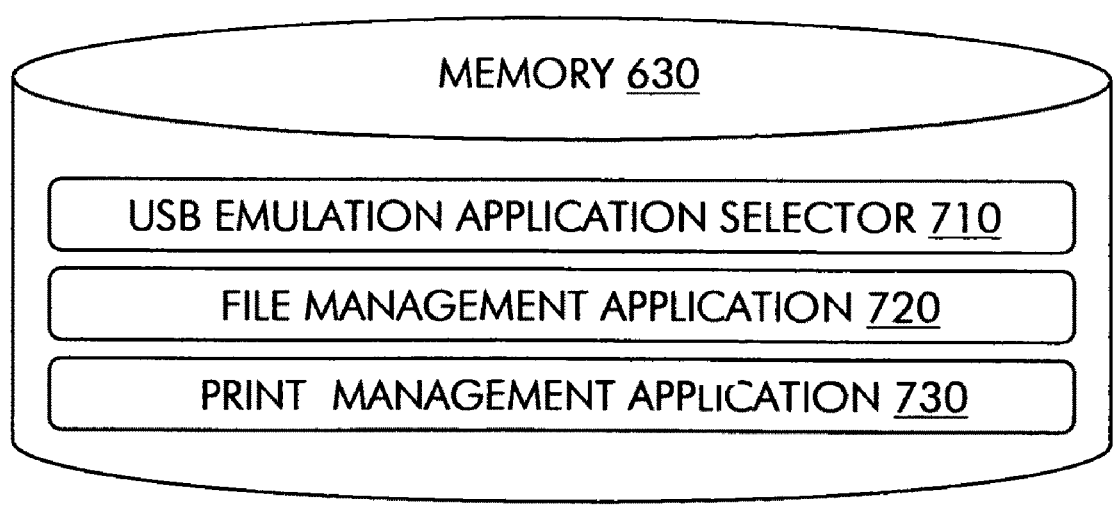
FIG. 7 shows elements stored on the application server of FIG. 1.

FIG. 7 shows elements stored on application server 130. Software elements stored in memory 630 and executable by processor 620 include a USB emulation application selector 710, file management application 720 and print management application 730. In some embodiments, application server 130 may support other applications, such as an authentication management and/or mobile payment management application. Moreover, in some embodiments, file management application 720, print management application 730 and/or other applications may be hosted on another server, or guest hosted on imaging device 120 using, for example, Java in a guest operating system.

USB emulation application selector 710 is a software element that selects applications for facilitating selection and uploading from client device 110 to imaging device 120 of document file 350. Application selector 710 receives from imaging device 120 identities of USB device interfaces supported by client device 110 and, in some embodiments, model information for client device 110, that were acquired by USB emulation agent 520 during USB device interface discovery. Application selector 710 may also receive other information concerning supported USB device interfaces acquired by USB emulation agent 520 during USB device interface discovery. Application selector 710 uses the received information to select applications that are suitable for facilitating accessing and controlling of client device 110 for selection and uploading of document file 350.

File management application 720 is an application that is selectable by USB emulation application selector 710 to interface with a supported USB device interface (e.g. USB mass storage interface) on client device 110 and imaging device 120 to facilitate selection and uploading to imaging device 120 of document file 350. File management application 720 commands client device 110 to upload file system information (e.g. file directory information) to imaging device 120, command imaging device 120 to display on front panel interface 420 and update based on user inputs a file browser window including uploaded file system information and enabling a user to browse uploaded file system information and command client device 110 to upload a selected document file 350 to imaging device 120 based on a user input on front panel interface 420 manifesting a user selection of document file 350.

Print management application 730 is an application that interfaces with imaging device 120 to facilitate printing on imaging device 120 of document file 350 after selection and uploading of document file 350. Print management application 730 commands imaging device 120 to display on front panel interface 420 and update based on user inputs a print management window identifying print settings supported on imaging device 120 and/or application server 130 and enabling a user to select print settings and command imaging device 120 to print document file 350 under the selected print settings based on a user input on front panel interface 420 manifesting a user decision to print document file 350.

Figure 8:
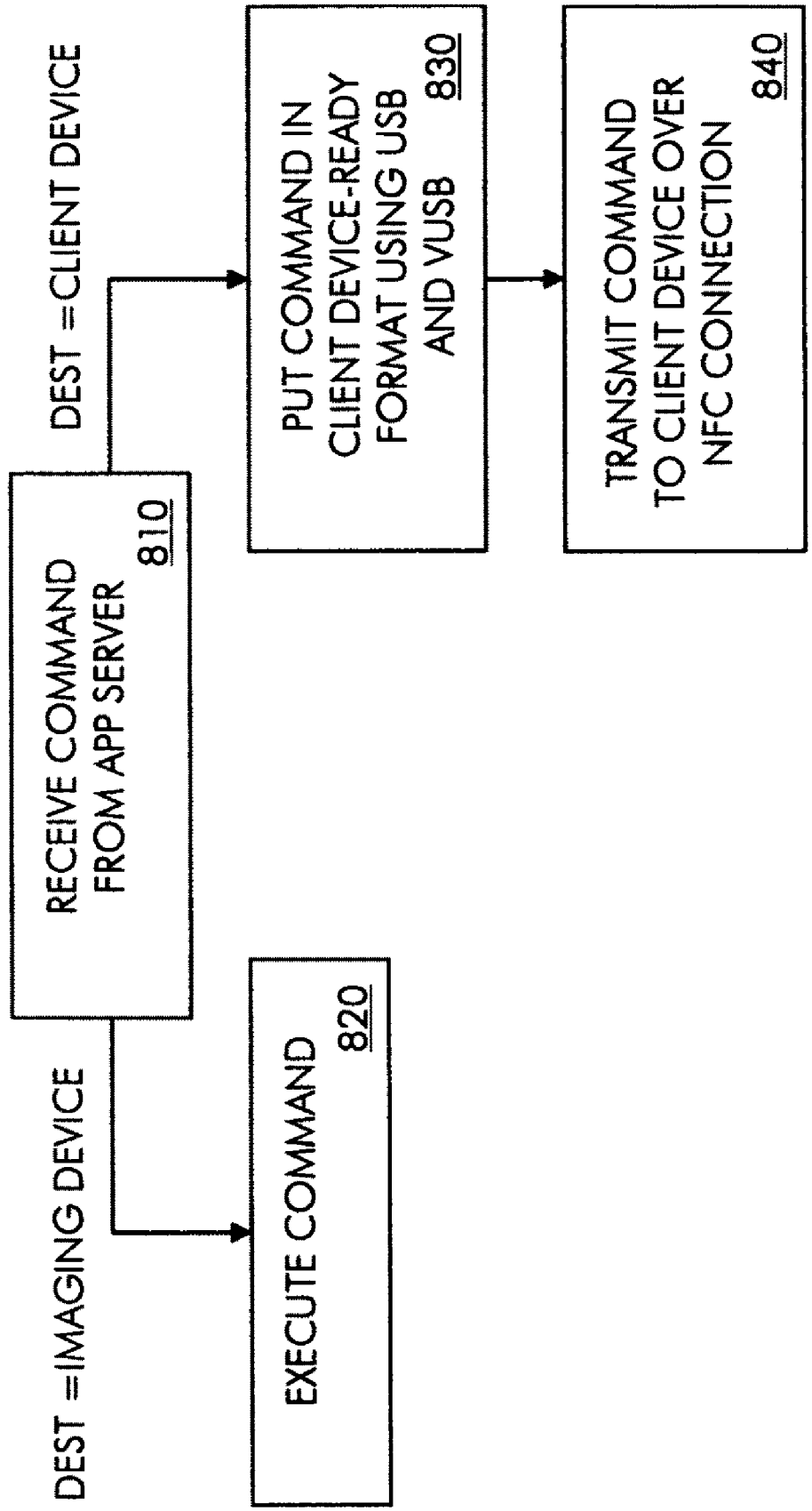
FIG. 8 shows method steps for handling commands from an application server in a system for VUSB over NFC printing in some embodiments of the invention.

FIG. 8 shows method steps performed on imaging device 120 for handling commands from application server 130 within a system for VUSB over NFC printing in some embodiments of the invention. Imaging device 120 receives via network interface 430 a command from application server 130 in an application server-compliant format (810). Operations controller 530 executing on processor 450 determines whether the command is destined for imaging device 120 or client device 110. If the command is destined for imaging device 120, operations controller 530 executes the command (820). If the command is destined for client device 110, operations controller 530 relays the command to USB emulation agent 520, which puts the command into a client device-ready format using a USB and VUSB protocol (830) and transmits the command to client device 110 via NFC interface 410 (840).

Figure 9:
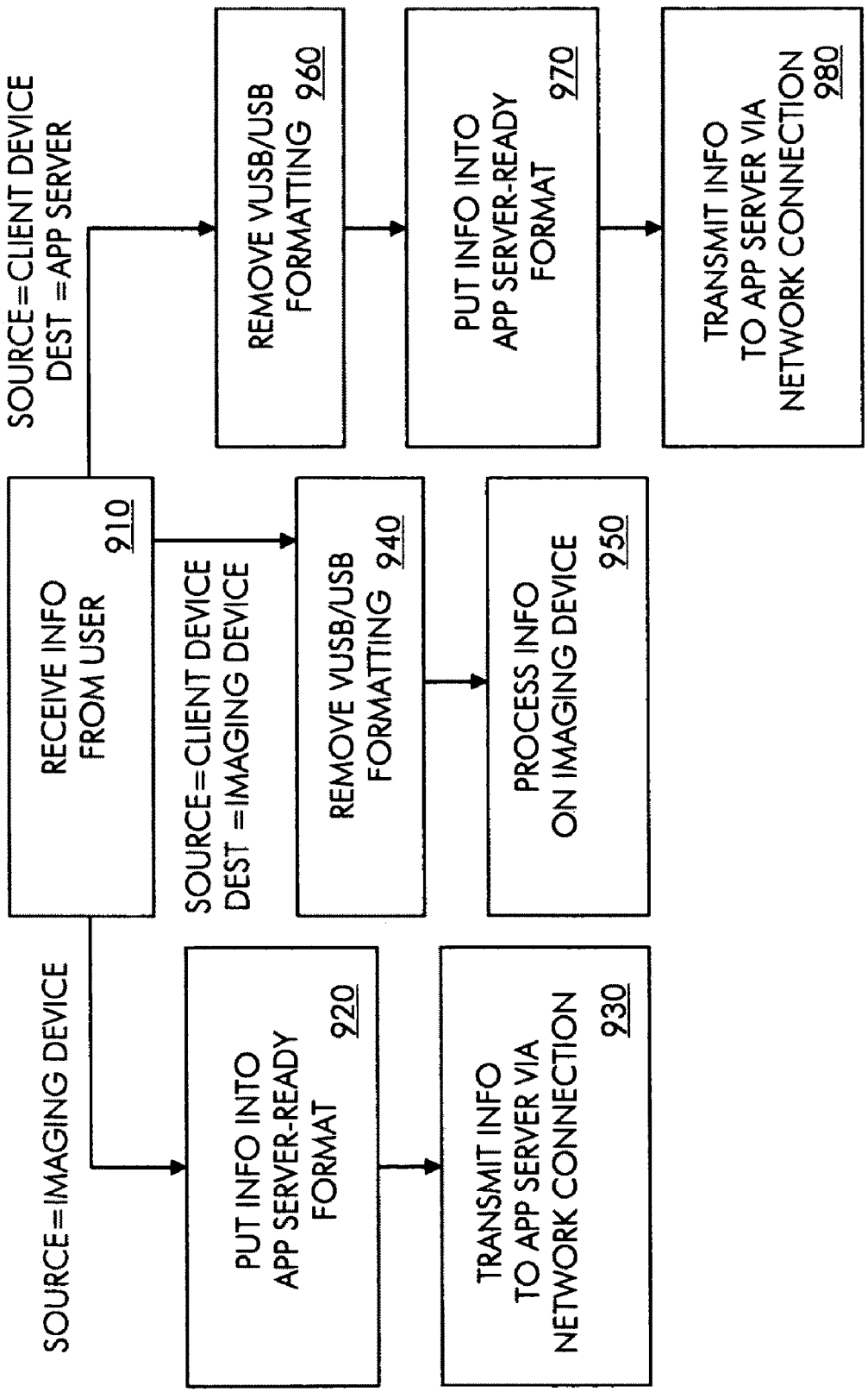
FIG. 9 shows method steps for processing information from user in a system for VUSB over NFC printing in some embodiments of the invention.

FIG. 9 shows method steps performed on imaging device 120 for processing information from a user within a system for VUSB over NFC printing in some embodiments of the invention. Imaging device 120 receives information from a user (910). If the information is received on front panel interface 420, operations controller 530 puts the information in an application server-ready format (920) and transmits the information via network interface 430 to application server 130 (930). If the information is received on NFC interface 410 and is destined for imaging device 120, USB emulation agent 520 removes VUSB/USB formatting (940) and relays the information to operations controller 530, which processes the information (950). If the information is received on NFC interface 410 and is destined for application server 130, USB emulation agent 520 removes VUSB/USB formatting (960) and relays the information to operations controller 530, which puts the information into an application server-ready format (970) and transmits the information via network interface 430 to application server 130 (980).

Figure 10:
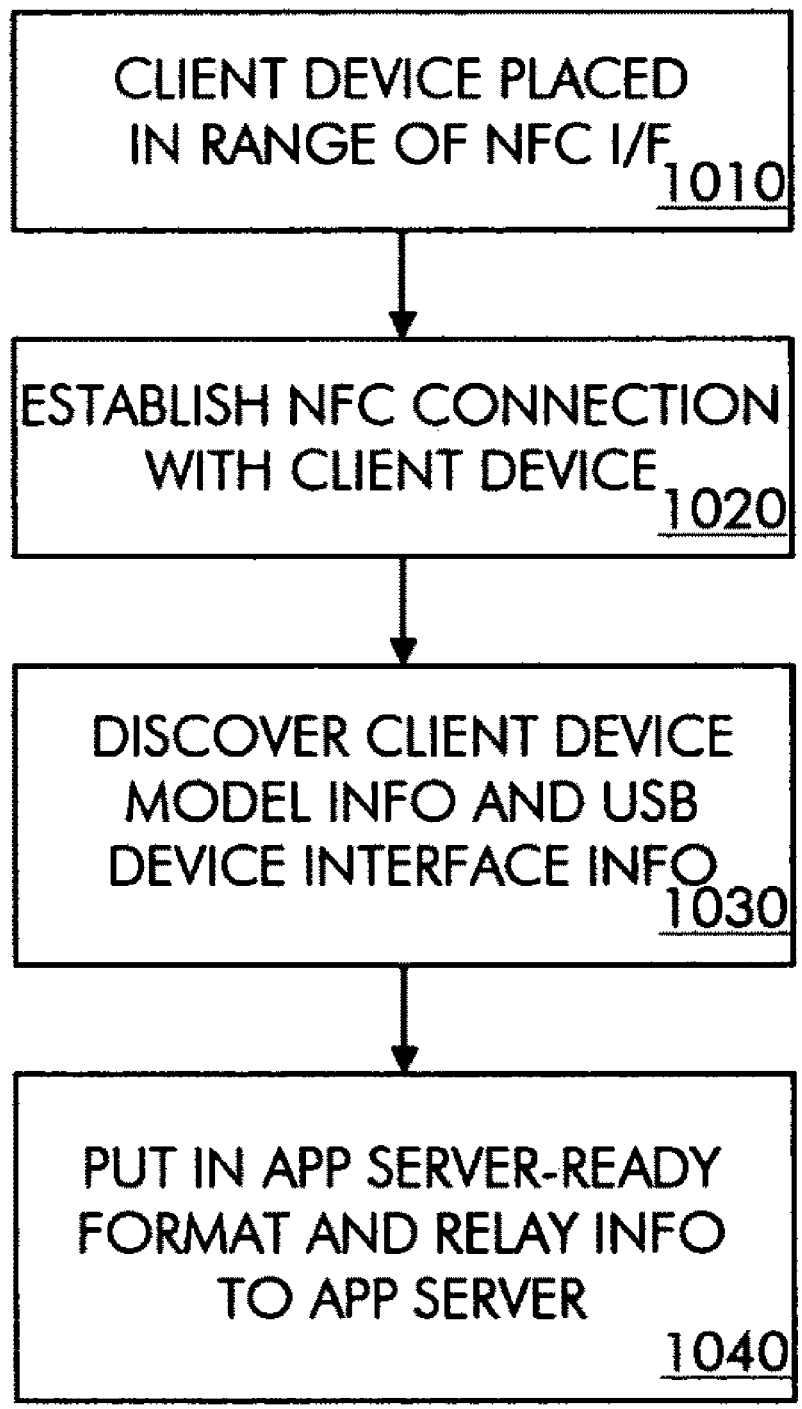
FIG. 10 shows method steps performed to facilitate configuration of a system for VUSB over NFC printing in some embodiments of the invention.

FIG. 10 shows method steps performed on imaging device 120 to facilitate configuration of a system for VUSB over NFC printing in some embodiments of the invention. When client device 110 moves in range of NFC interface 410 (1010), NFC unit 510 establishes an NFC connection with client device 110 (1020). USB emulation agent 520 discovers USB device interface and model information for client device 110 using VUSB over the NFC connection (1030). USB emulation agent 520 passes the USB device interface and model information to operations controller 530, which puts the information into an application server-ready format and transmits the information via network interface 430 to application server 130 (1040).

Figure 11:
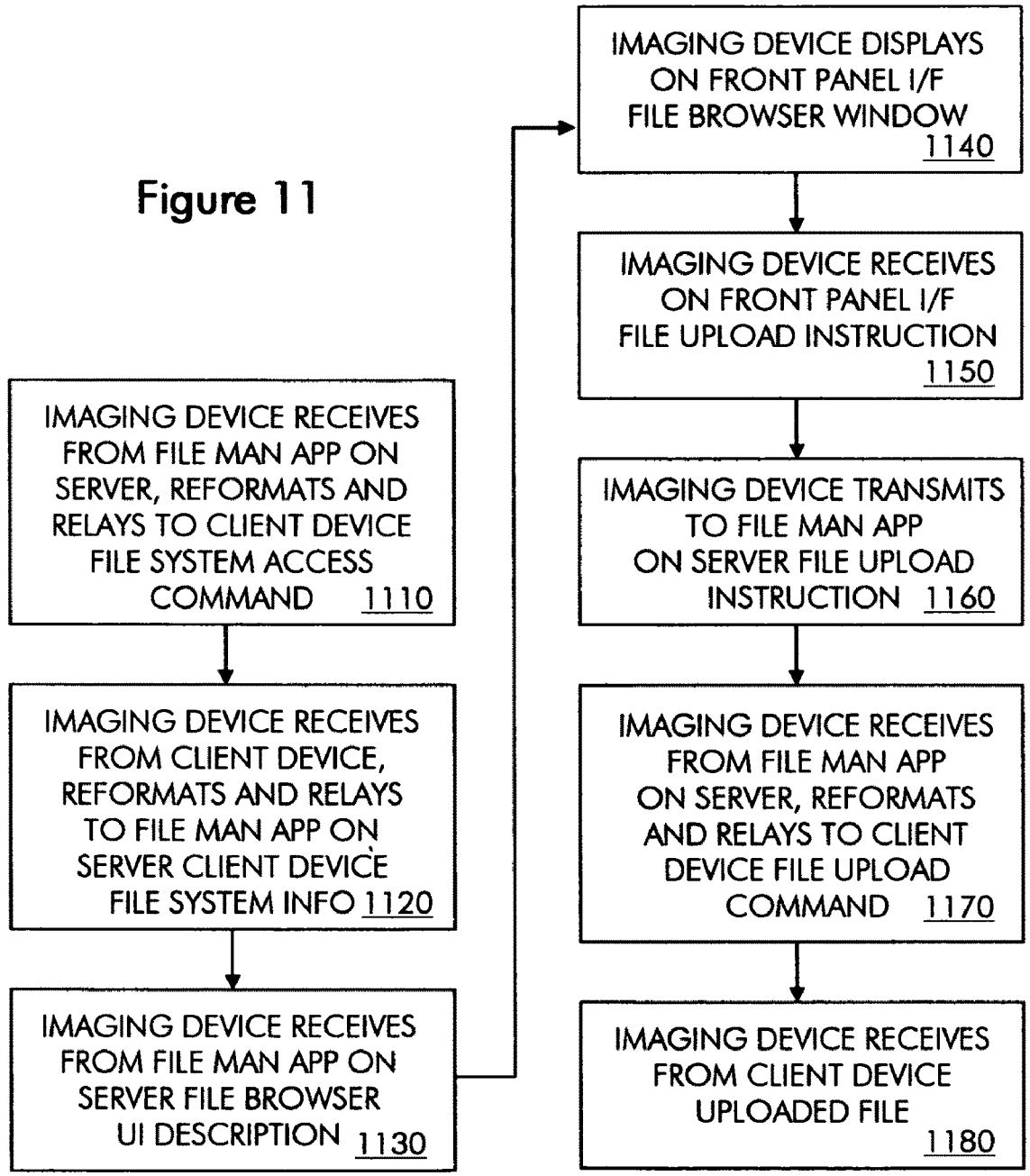
FIG. 11 shows method steps performed to facilitate selection and uploading of a document file in a VUSB over NFC printing method in some embodiments of the invention.

FIG. 11 shows method steps performed on imaging device 120 to facilitate selecting and uploading of document file 350 in a VUSB over NFC printing method in some embodiments of the invention. As a result of USB device interface discovery shown in FIG. 10 and described above, USB emulation application selector 710 selects file management application 720 to facilitate selecting and uploading of document file 350. Imaging device 120 accordingly receives via network interface 430 from file management application 720 a file system access command in an application server-compliant format. Operations controller 530 relays the command to USB emulation agent 520, which applies VUSB/USB formatting and passes the command to NFC unit 510 for transmission on the NFC connection to client device 110 (1110). In response to the file system access command, imaging device 120 receives via NFC interface 410 from client device 110 file system information in a VUSB/USB format. USB emulation agent 520 removes VUSB/USB formatting and relays the information to operations controller 530, which applies application server-ready formatting and passes the file system information via network interface 430 to application sever 130 (1120). File system information may include, for example, file directory information. In response to the file system information, imaging device receives via network interface 430 from file management application 720 a file browser user interface description (1130). Operations controller 530 causes a window corresponding to the user interface description to be displayed on front panel interface 420 (1140). In some embodiments, front panel interface 420 is segmented into two logical windows, a file browser window that accepts user inputs respecting file browser operations (e.g. view files, move files, select files) and a native window that accepts user inputs respecting operations supported natively by imaging device 120. Imaging device 120 then receives on front panel interface 420 user inputs that include a file upload instruction (1150). For example, a user may drag into the native window or otherwise select a file from the file browser window. Operations controller 530 transmits the file upload instruction via network interface 430 to application server 130 in an application server-ready format (1160). In response to the file upload instruction, imaging device 120 receives via network interface 430 from file management application 720 file upload command in an application server-compliant format. Operations controller 530 relays the command to USB emulation agent 520, which applies VUSB/USB formatting and passes the command to NFC unit 510 for transmission on the NFC connection to client device 110 (1170). In response to the file upload command, imaging device 120 receives via NFC interface 410 from client device 110 document file 350 uploaded in a VUSB/USB format (1180). USB emulation agent 520 removes VUSB/USB formatting and relays document file 350 to operations controller 530, which stores document file 350 in memory 460. In some embodiments, operations controller 530 converts document file 350 into print-ready data before storing document file 350 in memory 460.

Figure 12:
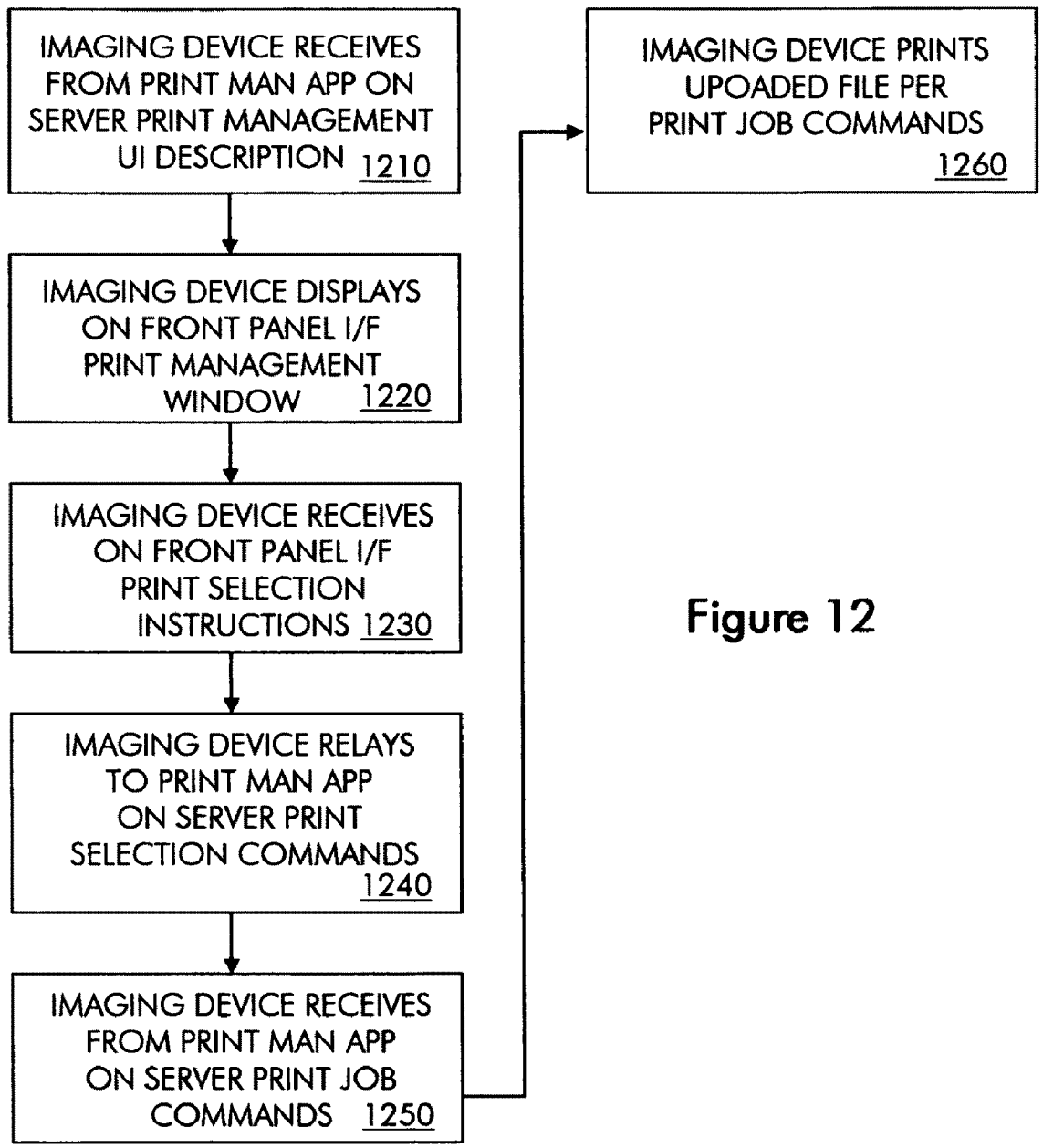
FIG. 12 shows method steps performed to print a document file in a VUSB over NFC printing method in some embodiments of the invention.

FIG. 12 shows method steps performed to print uploaded document file 350 in a VUSB over NFC printing method in some embodiments of the invention. Imaging device 120 receives via network interface 430 from print management application 730 a print management user interface description in an application server-compliant format (1210). In response to the print management user interface description, operations controller 530 causes a print management window corresponding to the user interface description to be displayed on front panel interface 420 (1220). The print management window may supplement or replace a native operations window. Imaging device 120 then receives on front panel interface 420 user inputs that include print selection instructions (1230). Print selection instructions include, for example, print settings chosen for application to a print job and an instruction to start the print job. Operations controller 530 transmits the print selection instructions via network interface 430 to application server 130 in an application server-ready format (1240). In response to the print selection instructions, imaging device 120 receives via network interface 430 from print management application 730 print job commands in an application server-compliant format (1250), in response to which operations controller 530 prints document file 350 in accordance with the print selection instructions (1260).

In other embodiments, imaging device 120 receives on front panel interface 420 print settings instructions in response to which operations controller 530 transmits the print settings instruction and document file 350 via network interface 430 to application server 130, in response to which imaging device 120 receives from application server 130 via network interface 430 a print command in conformance with the print settings instruction and document file 350 in a print-ready format and operations controller 530 prints document file 350 in conformance with the print command.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. An imaging device, comprising:
a processor;
a network interface communicatively coupled with the processor; and
a near field communication (NFC) interface communicatively coupled with the processor, wherein under control of the processor the imaging device communicates with a client device via the NFC interface, wherein under control of the processor the imaging device communicates with an application server via the network interface, and wherein under control of the processor the imaging device intermediates between the client device and the application server to enable a user to select and upload from the client device to the imaging device using a virtual Universal Serial Bus (VUSB) protocol a document file and facilitates printing of the document file; and
a front panel interface communicatively coupled with the processor, wherein the imaging device receives inputs from the user via the front panel interface and under control of the processor applies the inputs in intermediating between the mobile device and the application server to enable the user to select and upload from the client device to the imaging device the document file.

2. An imaging device, comprising:
a processor;
a network interface communicatively coupled with the processor; and
a NFC interface communicatively coupled with the processor, wherein under control of the processor the imaging device communicates with a client device via the NFC interface, wherein under control of the processor the imaging device communicates with an application server via the network interface, wherein under control of the processor the imaging device intermediates between the client device and the application server to enable a user to select and upload from the client device to the imaging device using a VUSB protocol a document file and facilitates printing of the document file, and wherein under control of the processor the imaging device generates one or more VUSB packets including one or more messages received from the application server via the network interface and transmits the VUSB packets to the client device via the NFC interface.

3. An imaging device, comprising:
a processor;
a network interface communicatively coupled with the processor; and
a NFC interface communicatively coupled with the processor, wherein under control of the processor the imaging device communicates with a client device via the NFC interface, wherein under control of the processor the imaging device communicates with an application server via the network interface, wherein under control of the processor the imaging device intermediates between the client device and the application server to enable a user to select and upload from the client device to the imaging device using a VUSB protocol a document file and facilitates printing of the document file, and wherein under control of the processor the imaging device receives one or more VUSB packets including one or more messages from the client device via the NFC interface, generates one or more application server-ready packets including the messages and transmits the application server-ready packets to the application server via the network interface.

4. An imaging device, comprising:
a processor;
a network interface communicatively coupled with the processor; and
a NFC interface communicatively coupled with the processor, wherein under control of the processor the imaging device communicates with a client device via the NFC interface, wherein under control of the processor the imaging device communicates with an application server via the network interface, wherein under control of the processor the imaging device intermediates between the client device and the application server to enable a user to select and upload from the client device to the imaging device using a VUSB protocol a document file and facilitates printing of the document file, and wherein under control of the processor the imaging device discovers via the NFC interface using the VUSB protocol USB device interface support information for the client device and relays the USB device interface support information via the network interface to the application server.

5. The imaging device of claim 4, wherein in response to the USB device interface support information the imaging device receives from the application server via the network interface a file system access command and under control of the processor relays the file system access command via the NFC interface to the client device using the VUSB protocol.

6. The imaging device of claim 5, wherein in response to the file system access command the imaging device receives from the client device via the NFC interface file system information using the VUSB protocol and under control of the processor transmits the file system information to the application server via the network interface.

7. The imaging device of claim 6, wherein in response to the file system information the imaging device receives from the application server via the network interface a file browser user interface description and under control of the processor displays on a front panel interface a file browser window in conformance with the file browser user interface description.

8. The imaging device of claim 7, wherein the imaging device receives on the front panel interface a file upload instruction and under control of the processor transmits the file upload instruction via the network interface to the application server.

9. The imaging device of claim 8, wherein in response to the file upload instruction the imaging device receives from the application server via the network interface a file upload command and under control of the processor relays the file upload command via the NFC interface to the client device using the VUSB protocol.

10. The imaging device of claim 9, wherein in response to the file upload command the imaging device receives from the client device via the NFC interface the document file using the VUSB protocol and transmits to the application server via the network interface a notification regarding the document file.

11. The imaging device of claim 10, wherein in response to the notification regarding the document file, the imaging device receives via the network interface a print management user interface description and under control of the processor displays on the front panel interface a print management window in conformance with the print management user interface description.

12. The imaging device of claim 11, wherein the imaging device receives on the front panel interface a print settings instruction and under control of the processor transmits the print settings instruction via the network interface to the application server.

13. The imaging device of claim 12, wherein in response to the print settings instruction the imaging device receives from the application server via the network interface a print command in conformance with the print settings instruction and under control of the processor converts the document file into a print-ready format and prints the document file in conformance with the print command.

14. The imaging device of claim 11, wherein the imaging device receives on the front panel interface a print settings instruction and under control of the processor transmits the print settings instruction and the document file via the network interface to the application server, in response to which the imaging device receives from the application server via the network interface a print command in conformance with the print settings instruction and the document file in a print-ready format and under control of the processor prints the document file in conformance with the print command.

15. A VUSB over NFC printing method, comprising the steps of:
   establishing communication with a client device via a NFC interface;
   establishing communication with an application server via a network interface;
   intermediating between the client device and the application server using a VUSB protocol to enable a user to select and upload from the client device a document file; and
   printing the document file, wherein the intermediating step comprises applying VUSB/USB formatting to messages outbound on the NFC interface and removing VUSB/USB formatting from messages received on the NFC interface.

16. A VUSB over NFC printing method, comprising the steps of:
   establishing communication with a client device via a NFC interface;
   establishing communication with an application server via a network interface;
   intermediating between the client device and the application server using a VUSB protocol to enable a user to select and upload from the client device a document file; and
   printing the document file, wherein the intermediating step comprises discovering via the NFC interface using the VUSB protocol USB device interface support information for the client device and relaying the USB device interface support information via the network interface to the application server.

17. The method of claim 16, wherein the intermediating step further comprises interfacing with a file management application on the application server to present the user with a file browser window from which the user selects the document file.

18. The method of claim 16, wherein the intermediating step further comprises interfacing with a print management application on the application server to present the user with a print management window from which the user selects settings for printing the document file.

* * * * *